Patented June 6, 1939

2,161,445

UNITED STATES PATENT OFFICE 2,161,445

RUBBER COMPOUNDING

John M. Ball, Pelham, N. Y., assignor to R. T. Vanderbilt Company, Incorporated, New York, N. Y., a corporation of New York No Drawing. Application December 15, 1936, Serial No. 115,956

5 Claims. (Cl. 106—23)

This invention relates to rubber compounding and particularly to the compounding of rubber products which are subjected to vulcanization. It is concerned with the development in rubber products, and especially in vulcanized rubber products, of a superior resistance to attack by hydrocarbons.

Most rubber compounds tend to deteriorate under the action of hydrocarbons. Prolonged contact with liquid petroleum hydrocarbons causes ordinary rubber products to swell and eventually to become weak, sticky, porous or non-resilient. Thus, swelling is a common cause of failure of gasoline hose, rubber footwear and other rubber products which come into frequent contact with petroleum products.

Not all rubber compounds are equally susceptible to attack by hydrocarbons. It is known that rubber compounds containing a high proportion of animal glue are somewhat more resistant and manifest less swelling when exposed to the action of hydrocarbons than do rubber compounds containing little or no glue. However, animal glue is a relatively expensive ingredient. At present it costs more than the crude or reclaimed rubber which it would replace in a compound. There is, therefore, a distinct need for a compounding agent which is less costly than animal glue and which will impart to rubber compounds a high resistance against attack by hydrocarbons and limit the deterioration of the compound that is manifested by swelling. This desirable property in rubber compounds is referred to hereinafter as "swell-resistance".

As a result of my investigations I have discovered a compounding agent that is considerably cheaper than animal glue and superior thereto for imparting swell-resistance to rubber compounds. Starch and its diastatic conversion products such as dextrin are considerably cheaper than animal glue and are likely to remain so, because of the variety and abundance of the sources of starch and the fact that diastatic conversion processes are relatively inexpensive operations. I have discovered that when a dispersion of a colloidal diastatic conversion product of starch in rubber is incorporated into a rubber compound that is subsequently subjected to vulcanization, the vulcanized product possesses a high swell resistance as well as other desirable properties.

My invention contemplates, in addition to the above-described compounding agent, a method of manufacture of the compounding agent, an improvement in the manufacture of vulcanized rubber products and an improved vulcanized rubber product.

In summary, the method of manufacture of the compounding agent comprises mixing a liquid dispersion of rubber, preferably in the form of an aqueous dispersion or as liquid latex, with a liquid dispersion of a colloidal diastatic conversion product of starch and drying the resulting mixture.

The improvement in the manufacture of vulcanized rubber products contemplated by my invention comprises subjecting to vulcanization a rubber compound including a colloidally-dispersed diastatic conversion product of starch.

My invention further contemplates, as an article of manufacture, the product of vulcanization of a rubber compound including a colloidal diastatic conversion product of starch.

These and other aspects of my invention will be more thoroughly understood in the light of the following detailed description of my presently preferred practices.

Commercial diastatic conversion products, such as dextrin, may be employed provided that they are in the form of a colloidal dispersion. However, I prefer to employ a diastatic conversion product of starch prepared as follows:

*Preparation of the diastatic conversion product of starch*

About 1000 grams of suitable starch (for example a uniform grade of tapioca) is placed in a pony churn together with at least 3000 cubic centimeters of cold water and 10 cubic centimeters of a diastatic enzyme. Steam is blown at a moderate rate into the contents of the churn while the latter is continually stirred, so that the temperature of the contents rises to a maximum of 160° F. after about 15 minutes. The contents of the churn is then maintained at this temperature for about 15 minutes.

As the temperature begins to rise under the influence of the steam, the mixture thickens perceptibly and then thins out again. In the absence of the enzyme, starch of the nature of tapioca would become so thick in a mixture of the above described concentration that stirring would be difficult, if not impossible.

After the mixture has been heated for about 15 minutes at 160° F. the temperature of the mixture is raised quickly to 185° F. or above. This temperature increase brings about the destruction of the enzyme and interrupts diastatic conversion. Promptly thereafter about 10 cubic centimeters of a 10% ammonia solution should be added to make the mixture slightly alkaline, and then about 2 grams of a suitable preservative such as beta-naphthol or orthophenylphenol should be added. The preservatives dissolve readily at the temperature and degree of dilution obtaining in the mixture at the end of the heating period.

The mixture is then strained through cheesecloth or the like to remove particles of foreign matter which were present in the original starch.

Satisfactory results are obtained if, instead of the diastatic conversion product prepared as above, an aqueous dispersion of ordinary dextrin is prepared by mixing the dextrin in about 3 times its weight of water and heating the mixture until a smooth colloidal mass is obtained. Ammonia and a small amount of a suitable preservative should be added to the mixture as described hereinbefore.

The ratio of water to starch or dextrin employed is not critical. There should be enough water, however, to ensure that the diastatic conversion product is rendered colloidal. Moreover, the amount of water should permit the formation of a final mixture which is not too viscous. On the other hand, the use of excess water should be avoided because it merely adds to the cost of the operation by imposing an additional burden of evaporation.

*Preparation of the compounding agent, or "masterbatch"*

To the aqueous mixture of the diastatic conversion product prepared as above (or to an equivalent quantity of a colloidal aqueous mixture of commercial dextrin) is added an amount of liquid rubber latex having a content of dry rubber solids in the neighborhood of 500 grams, or about half the dry weight of the diastatic conversion product. I prefer to use about 1420 cubic centimeters of liquid rubber latex or of water-dispersed rubber having a dry rubber solid content of about 35% by weight. After the addition of the latex, the mixture is churned for a few minutes to ensure thorough dispersion, and then the mixture is poured into shallow open pans and allowed to evaporate at room temperature until a high concentration of solids (say 80-90% by weight) is obtained. Thereafter evaporation of the water and mixture is completed in a vacuum drier. The temperature in the drier should not exceed that at which decomposition of the diastatic conversion product begins to occur (say 180° F.). The product from the drier is hard and horny, but is capable of softening on a rubber mixing mill.

The ratio of diastatic conversion product to solid rubber in the mixture is not precisely critical. I have found, however, that the results are better when this ratio is maintained in the neighborhood of that set forth in the practices just described, i. e. with about half as much solid rubber as starch or dextrin on the basis of weight. When this approximate ratio is maintained the resulting compounding agent is sufficiently brittle to break up readily on a rubber mill and also softens readily upon further grinding.

As indicated above, the amount of water or other volatile liquid employed to disperse the rubber and to render the diastatic conversion product colloidal should not be in excess of that actually needed for these purposes. Otherwise, useless additional evaporation is imposed upon the operation. In general, the proportions of liquid in the latex (±65% by weight) and in the starch-water or dextrin-water mixtures (±80% by weight) will be found satisfactory.

*Incorporation of the compounding agent into the rubber compound*

To prepare a rubber compound having a superior resistance to the swelling action of hydrocarbons, a suitable quantity of the compounding agent or "masterbatch" is broken down and softened by grinding on the mixing mill. Thereafter crude or reclaimed rubber, a vulcanizing agent, and other ingredients such as softeners, curing agents, antioxidants, and fillers are added on the mill and the grinding is continued in the conventional manner until the mass is relatively homogeneous. The exact proportions of compounding agent, rubber, vulcanizing agent, and other ingredients will depend principally upon the use for which the final product is intended. Suitable proportions for various types of rubber compounds are indicated hereinafter (see formulae 1 to 5, set forth hereinafter).

The following table gives the results of tests conducted to determine the physical character of rubber compounds prepared in accordance with my invention, and also gives results obtained when no diastatic conversion product of starch was employed and when a diastatic conversion product of starch was added to rubber compounds without being subjected to a preliminary treatment to render it colloidal.

In all cases the same base stock was employed. It comprised:

| Ingredients | Parts by weight |
|---|---|
| Smoked rubber sheets | 100 |
| Stearic acid | 1 |
| Phenyl-beta-naphthylamine | 1 |
| Zinc oxide | 5 |
| Benzothiazyl disulfide | 1 |
| Tetramethylthiuram disulfide | 0.1 |
| Sulfur | 2.75 |
| Total | 110.85 |

In each case 110.85 parts by weight of the combined ingredients in the above tabulation was employed and the following additions made:

| Sample | Ingredient | Parts by weight |
|---|---|---|
| A | None | 0 |
| B | Powdered tapioca starch | 58 |
| C | Powdered dextrin | 58 |
| D | Colloidal dextrin introduced as latex masterbatch | 58 |
| E | Converted starch introduced as latex masterbatch | 58 |
| F | Converted starch introduced as latex masterbatch | 116 |

In samples D, E and F the amount of smoked sheet in the base formula is in each case reduced by the amount of latex rubber present in the masterbatch to make the total rubber content constant in all cases. Each of the samples D, E and F was prepared by subjecting the respective compounding agent shown in the table immediately above to a preliminary grinding on a conventional rubber mill for about 3 minutes, and thereafter adding the other ingredients (totalling 110.85 parts by weight in each case) on the mill. Grinding was continued for about 10 minutes in each case, so that the mixture was substantially homogeneous. Then each sample was divided into portions, which were vulcanized in a platen press at 141° C. for periods of respectively 10, 15, 20 and 30 minutes each.

Thereafter the portions of each sample which had been subjected to different vulcanizing treatments were subjected to tests to determine tensile strength, percent elongation at break, and amount of load at 500% elongation.

The portions of each sample which were subjected to press cure for 15 minutes each were also subjected to tests to determine their swell-resistance. This was done by immersing them in gasoline at room temperature for 24 hours and then measuring the increase in volume of each one.

Table I, below, is a summary of the foregoing data and of the results of the tests.

Table I

| Sample | A | B | C | D | E | F |
|---|---|---|---|---|---|---|
| *Ingredients—parts by weight* | | | | | | |
| Rubber—smoked sheets | 100 | 100 | 100 | 100 | 100 | 100 |
| Stearic acid | 1 | 1 | 1 | 1 | 1 | 1 |
| Phenyl-beta-naphthylamine | 1 | 1 | 1 | 1 | 1 | 1 |
| Zinc oxide | 5 | 5 | 5 | 5 | 5 | 5 |
| Benzothiazyl disulfide | 1 | 1 | 1 | 1 | 1 | 1 |
| Tetramethylthiuram disulfide | 0.1 | 0.1 | 0.1 | 0.1 | 0.1 | 0.1 |
| Sulfur | 2.75 | 2.75 | 2.75 | 2.75 | 2.75 | 2.75 |
| Powdered tapioca starch | | 58 | | | | |
| Powdered dextrin | | | 58 | | | |
| Colloidal dextrin as latex masterbatch | | | | 58 | | |
| Converted starch as latex masterbatch | | | | | 58 | 116 |
| Physical Properties | | | | | | |
| *Load at 500% elongation, lbs. per square inch, press cure* | | | | | | |
| 10 min. at 40 lbs. steam (141° C.) | 550 | 420 | | 1310 | 1205 | |
| 15 min. at 40 lbs. steam (141° C.) | 610 | 390 | 650 | 1305 | 1240 | |
| 20 min. at 40 lbs. steam (141° C.) | 570 | 400 | 570 | 1220 | 1200 | |
| 30 min. at 40 lbs. steam (141° C.) | 570 | 385 | 530 | 1225 | 1150 | |
| *Tensile strength lbs. per square inch, press cure* | | | | | | |
| 10 min. at 40 lbs. steam (141° C.) | 3760 | 2130 | | 2050 | 1915 | 820 |
| 15 min. at 40 lbs. steam (141° C.) | 3950 | 2110 | 2110 | 2020 | 2040 | 995 |
| 20 min. at 40 lbs. steam (141° C.) | 3760 | 2000 | 2130 | 1965 | 1920 | 870 |
| 30 min. at 40 lbs. steam (141° C.) | 3540 | 1970 | 1980 | 1915 | 1810 | 795 |
| *Percent elongation at break, press cure* | | | | | | |
| 10 min. at 40 lbs. steam (141° C.) | 775 | 790 | | 590 | 600 | 455 |
| 15 min. at 40 lbs. steam (141° C.) | 770 | 785 | 730 | 580 | 615 | 460 |
| 20 min. at 40 lbs. steam (141° C.) | 770 | 770 | 740 | 605 | 605 | 470 |
| 30 min. at 40 lbs. steam (141° C.) | 775 | 785 | 750 | 615 | 593 | 460 |
| *Gasoline resistance (percent volume increase after 24-hr. immersion in gasoline at room temperature), press cure* | | | | | | |
| 15 min. at 40 lbs. steam (141° C.) | 265 | 213 | 208 | 183 | 181 | 126 |

From the results in these and other tests, I have determined that (1) Diastatic conversion products of starch are effective in increasing the swell-resistance of vulcanized rubber compounds into which they are incorporated.

(2) Both commercial dextrin and starch which has been subjected to diastatic conversion are effective in increasing swell-resistance.

(3) Colloidal diastatic conversion products of starch which have been dispersed in latex or the like are more effective for increasing swell-resistance than are dry powdered diastatic conversion products.

(4) Colloidal diastatic conversion products of starch have a marked effect in decreasing "stretch" of rubber compounds into which they are incorporated. This is manifested by the fact that vulcanized rubber products containing a colloidally dispersed diastatic conversion product will support a load at 500% elongation which is more than double the load that can be supported by rubber compounds which contain no starch or dextrin or into which starch or dextrin was incorporated in powdered form.

(5) Colloidal diastatic conversion products of starch decrease the tensile strength of rubber compound into which they are incorporated, but not to a substantially greater degree than an equal quantity of dry powdered starch or dextrin.

(6) Rubber compounds containing colloidally dispersed diastatic conversion products of starch manifest a decrease in tensile strength if the time of vulcanization is prolonged beyond the optimum, but the rate of decrease is relatively small, so that satisfactory tensile strength can be obtained in rubber products containing colloidally dispersed dextrin or the like without delicate control of the time of vulcanization.

(7) The swell-resistance of the product of vulcanization of rubber compounds containing colloidally-dispersed diastatic conversion products of starch increases as the proportion of the conversion product in the rubber compound increases.

(8) The optimum proportion of colloidally-dispersed diastatic conversion products of starch (to be included in a given rubber compound to be subjected to vulcanization) is a function of the desired swell-resistance, stretch and tensile strength desired in the final vulcanized product.

(9) Colloidally-dispersed diastatic conversion products of starch can be employed in rubber compounds in greater proportions than can animal glue, thus increasing swell resistance and decreasing stretch characteristics without unduly decreasing tensile strength.

(10) There is an optimum vulcanizing period for all rubber compounds containing diastatic conversion products of starch at the end of which tensile strength and stretch characteristics have attained approximate peak values. The length of this vulcanizing period is a function of the type of apparatus employed, and the temperature and pressure to which the compound is subjected during vulcanization. The length of the vulcanizing period apparently is largely independent of the proportion of the diastatic conversion product of starch present in the compound. In the series of tests reported in Table I the optimum vulcanizing period in a platen press at 141° C. was 15 minutes.

The following formulae exemplify the practice of the invention for the manufacture of various types of vulcanized rubber compounds in which a high swell resistance is essential or desirable. In all cases the compounds were prepared by first grinding on a rubber mill the hard horny compounding agent of the invention (made as described hereinbefore) until the agent became soft. Thereafter the other ingredients were added on the mill and the grinding was continued until the mass on the mill appeared homogeneous. The degree and character of mixing required in the preparation of rubber compounds containing the compounding agent of this invention is substantially the same as that which would be required for the same compound minus the compounding agent, except that it is desirable to first break down and soften the compounding agent by grinding it alone.

Following the grinding of the compounds, each was vulcanized in a manner appropriate to its character and intended use. The particular vulcanizing treatment in each case is set out immediately following the respective formula. In all cases the vulcanized products were commercially desirable.

FORMULA 1

Black gasoline hose

| | Parts by weight |
|---|---|
| Rubber (smoked sheets 87.5+latex rubber 12.5 in masterbatch) | 100 |
| Stearic acid | 1 |
| Phenyl-beta-naphthylamine | 1 |
| Zinc oxide | 5 |
| Sulfur | 0.75 |
| Benzothiazyl disulfide | 1.0 |
| Tetramethylthiuram disulfide | 0.25 |
| Selenium | 0.25 |
| Soft finely divided carbon | 75 |
| Colloidally-dispersed diastatic conversion product of starch | 25 |
| | 209.25 |

The above mixture, after thorough milling, was subjected to an open steam cure for 30 minutes with 40 lbs. of steam (141° C.). The physical properties of the cured product are indicated by the results of tests set forth below:

| | |
|---|---|
| Load at 300% elongation___lbs. per sq. in__ | 820 |
| Tensile strength_____do____ | 1950 |
| Per cent elongation at break | 515 |

FORMULA 2

White gasoline hose

| | Parts by weight |
|---|---|
| Rubber (pale crepe 87.5+latex rubber 12.5 in masterbatch) | 100 |
| Stearic acid | 1 |
| Antioxidant | 1 |
| Zinc oxide | 100 |
| Whiting | 100 |
| Barytes | 50 |
| Mercaptobenzothiazole | 0.5 |
| Sulfur | 4 |
| Colloidally-dispersed diastatic conversion product of starch | 25 |
| | 381.5 |

The above mixture, after thorough milling, was subjected to an open steam cure for 30 minutes. The steam temperature was 141° C. and its pressure was 40 lbs. per square inch. The character of the cured product is indicated by the following results of tests conducted upon it:

| | |
|---|---|
| Load at 300% elongation____lbs. per sq. in__ | 740 |
| Tensile strength_____do____ | 840 |
| Per cent elongation at break | 365 |

FORMULA 3

No mark sole

| | Parts by weight |
|---|---|
| Rubber (pale crepe 87.5+latex rubber 12.5 in masterbatch) | 100 |
| Stearic acid | 1 |
| Antioxidant (a complex phenolic compound) | 1 |
| Zinc oxide | 5 |
| Montan wax | 5 |
| Shellac | 5 |
| Powdered clay (kaolin) | 150 |
| Calcium carbonate (finely divided material treated with stearic acid) | 20 |
| Benzothiazyl disulfide | 1.5 |
| Tetramethylthiuram disulfide | .15 |
| Sulfur | 3.5 |
| Colloidally-dispersed diastatic conversion product of starch (latex dispersion) | 25 |
| | 317.15 |

The above mixture after thorough grinding on the mill was subjected to a press cure for 12 minutes at 60 lbs. steam pressure (153° C.). The results of tests conducted upon the cured material are as follows:

| | |
|---|---|
| Load at 100% elongation___lbs. per sq. in__ | 920 |
| Tensile strength_____do____ | 1305 |
| Per cent elongation at break | 245 |

FORMULA 4

Boot upper

| | Parts by weight |
|---|---|
| Rubber (smoked sheet 90+latex rubber 10 in masterbatch) | 100 |
| Plasticizer * | 1 |

| | Parts by weight |
|---|---|
| *"SulfoA" (a sulfonated petroleum product) | 15 |
| Normal butyl alcohol | 5 |
| Mineral oil (300° F. flash) | 80 |
| Total | 100 |

| | |
|---|---|
| Stearic acid | 1 |
| Antioxidant (ditolylamines with petroleum wax) | 1 |
| Zinc oxide | 5 |
| Carbon black | 5 |
| Soft carbon (made by thermal decomposition of natural gas) | 30 |
| Calcium carbonate (finely divided material treated with stearic acid) | 20 |
| Mercaptobenzothiazole | 1.25 |
| Tetramethylthiuram disulfide | .125 |
| Sulfur | 2.25 |
| Colloidally-dispersed diastatic conversion product or starch | 20 |
| | 186.625 |

The above mixture, after thorough milling, was subjected to a dry heat cure under 30 lbs. air pressure. During the first 30 minutes of the curing the temperature rose to 255° F., and thereafter the mixture was maintained for 90 minutes at this temperature. The following data show the results of tests conducted upon the cured product:

| | |
|---|---|
| Load at 300% elongation____lbs. per sq. in__ | 1090 |
| Tensile strength_____do____ | 2750 |
| Per cent elongation at break | 535 |

FORMULA 5

*Boot sole*

| | Parts by weight |
|---|---|
| Rubber (smoked sheets 87.5+latex rubber 12.5 in masterbatch) | 100 |
| Mineral rubber | 5 |
| Stearic acid | 2.5 |
| Phenyl-beta-naphthylamine | 1 |
| Zinc oxide | 5 |
| Carbon black | 25 |
| Powdered clay | 50 |
| Mercaptobenzothiazole | 1.5 |
| Tetramethylthiuram disulfide | .15 |
| Sulfur | 2.75 |
| Colloidally-dispersed diastatic conversion product of starch | 25 |
| | 217.9 |

The above mixture, after thorough milling, was subjected to a dry heat cure under 30 lbs. pressure. After a 60 minute curing period during which the temperature rose to 260° F. and a 90 minute period in which the product was maintained at 260° F., the product was subjected to test with the following results:

| | |
|---|---|
| Load at 300% elongation___lbs. per sq. in__ | 1800 |
| Tensile strength_____do____ | 2570 |
| Per cent elongation at break_____ | 400 |

When the dry heat curing period was extended for an additional 30 minutes at 260° F. the product manifested the following characteristics:

| | |
|---|---|
| Load at 300% elongation___lbs. per sq. in__ | 1890 |
| Tensile strength_____do____ | 2330 |
| Per cent elongation at break_____ | 365 |

I claim:

1. Rubber articles capable of resisting swelling when in contact with hydrocarbons including a rubber composition obtained by preparing an aqueous mixture of latex and dextrin from which substantially all of the water has been removed, and additional rubber mixed therewith and vulcanized.

2. Rubber articles capable of resisting swelling when in contact with hydrocarbons including a rubber composition obtained by preparing an aqueous mixture of latex containing substantially one part of dry rubber solids and substantially two parts of dextrin from which substantially all of the water has been removed, and additional rubber mixed therewith and vulcanized.

3. A compounding agent for use in the production of rubber capable of resisting swelling when in contact with hydrocarbons consisting essentially of the dry product obtained by preparing an aqueous mixture of latex and dextrin and removing substantially all of the water therefrom.

4. In the manufacture of vulcanized rubber products capable of resisting swelling when in contact with hydrocarbons, the process comprising preparing an aqueous mixture containing latex and dextrin, drying said mixture, incorporating the dried material into a rubber compound and thereafter subjecting the compound to vulcanization.

5. A compounding agent for use in the production of rubber capable of resisting swelling when in contact with hydrocarbons consisting essentially of the dry product obtained by preparing an aqueous mixture of latex containing substantially one part of dry rubber and substantially two parts of dextrin, and removing substantially all of the water therefrom.

JOHN M. BALL.